Feb. 25, 1930.  F. NAGLER  1,748,892
HYDRAULIC PROCESS AND APPARATUS
Filed Oct. 20, 1917
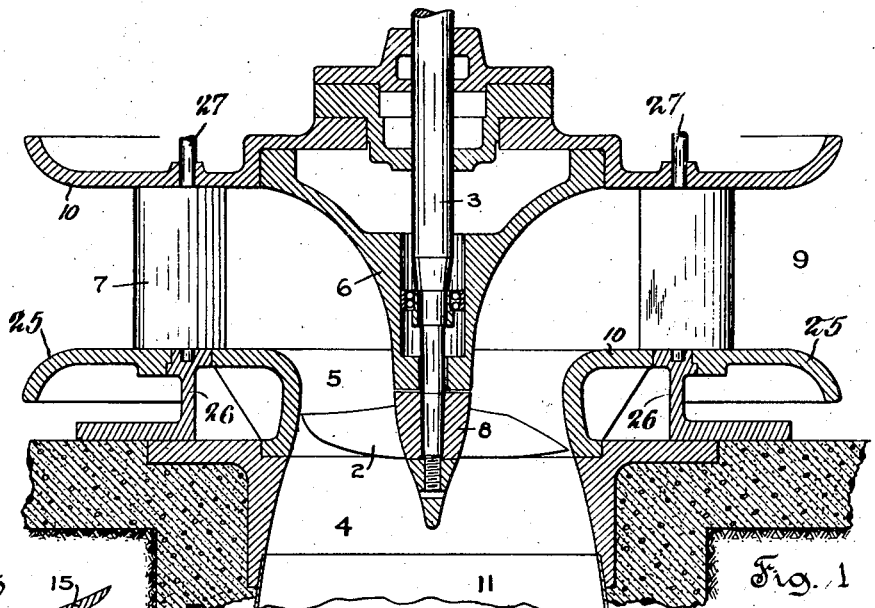
Fig. 1
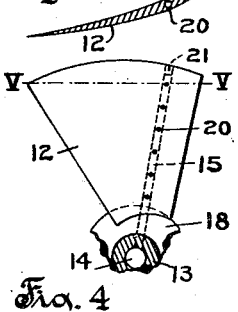
Fig. 5
Fig. 4
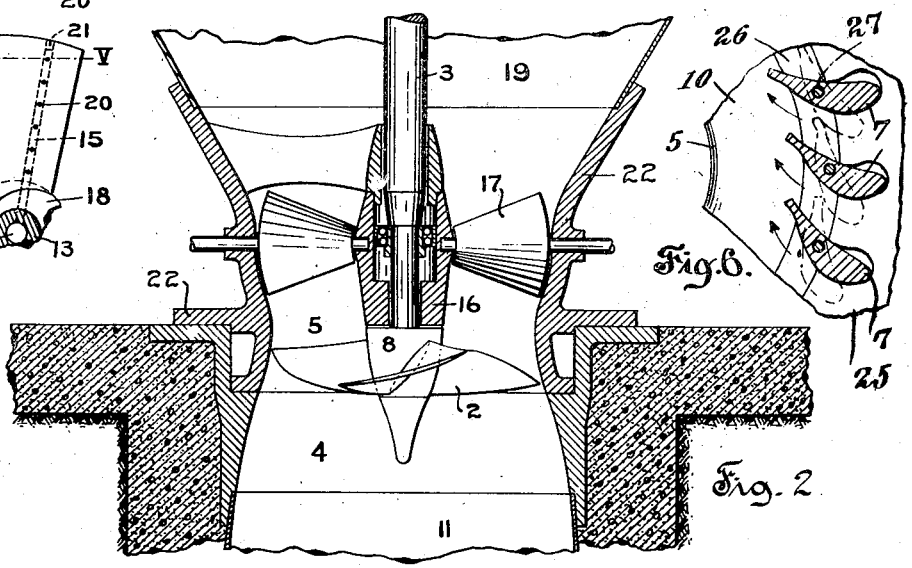
Fig. 2
Fig. 6
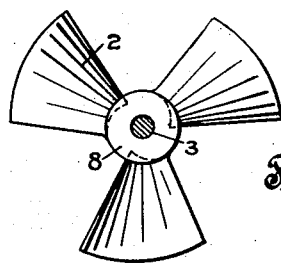
Fig. 3
Inventor
F. Nagler
by
Attorney Patented Feb. 25, 1930

1,748,892

UNITED STATES PATENT OFFICE

FORREST NAGLER, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

HYDRAULIC PROCESS AND APPARATUS

Application filed October 20, 1917. Serial No. 197,964.

This invention relates to an improved process of and apparatus for converting hydraulic potential energy into kinetic energy.

An object of the invention is to provide a simple and efficient process of converting hydraulic potential energy into kinetic energy. Another object is to provide simple and efficient apparatus for converting hydraulic potential energy into kinetic energy. A more specific object is to provide a process of and apparatus for effectively converting hydraulic potential energy into relatively high speed rotary motion, in order to permit utilization of more compact, simple and efficient energy-translating machinery than has heretofore been possible. Another specific object is to provide a hydraulic turbine which will operate at substantially uniform high efficiency regardless of variations in the available hydraulic head or of the selected speed of rotation of the unit.

The invention consists primarily in producing in a conduit a swirling stream of liquid and locating in the stream an impeller having a projected vane area substantially less than the adjacent conduit cross-section and formed to have sufficient vane velocity across the stream to prevent cavitation and to obstruct and decelerate the entire stream. By "cavitation" as used throughout this specification and claims, is meant the formation of holes or cavities in the liquid stream as a result of violent agitation of the liquid. By "obstruct" is meant momentary hindering of the flow or delay of the liquid during conversion of the velocity energy of the stream into rotary motion of the impeller, without agitating the stream or excessively deflecting the same from its course. The stream is caused to swirl in a definite direction by delivery thereof past suitable guide vanes. The velocity of the liquid is preferably augmented in the locality of the impeller, by constricting the adjacent portion of the conduit. The impeller, which is preferably of the axial flow type, is provided with one or more vanes fixed to and radiating from a central hub and located as near as possible to the hub axis, the vanes having an area which when projected upon a plane perpendicular to the impeller axis, is substantially less than the area of the conduit at the constriction, thereby providing one or more unobstructed axial passages through the impeller when stationary. The impeller vane surfaces which are exposed to the direct flow of the liquid, are formed at such angles relatively to a plane perpendicular to the direction of flow of the stream, that the vanes will be urged forward across the stream a considerable distance for a relatively small advance of the liquid along the conduit, the shape and angularity of the vanes being such that the vane velocity across the stream is sufficient to obstruct and to decelerate the entire stream, without producing cavitation in the liquid. The number of impeller vanes and the wetted impeller surface are reduced to a minimum in order to minimize the friction losses, the extent of such reduction of impeller surface being limited, however, by the actual surface necessary to efficiently produce the desired power. The friction losses are further reduced in one embodiment of the invention by producing an air film on the trailing vane surfaces.

Some of the novel features disclosed but not specifically claimed herein, are claimed in a copending application for patent, filed Sept. 26, 1919, and bearing Serial No. 327,349.

A clear conception of several embodiments of the invention may be had by referring to the drawing accompanying and forming a part of this specification in which like reference characters designate the same or similar parts in the various views.

Fig. 1 is a central vertical section through an open flume hydraulic turbine installation embodying inward flow guide vanes.

Fig. 2 is a central vertical section through an open flume hydraulic turbine installation embodying axial flow guide vanes, the turbine impeller being shown in elevation.

Fig. 3 is a top plan view of a three-vane turbine impeller.

Fig. 4 is a fragmentary enlarged part sectional bottom plan view of a modified form of impeller.

Fig. 5 is a vertical section taken along the line V—V of Fig. 4, through the modified form of impeller vane.

Fig. 6 is a fragmentary transverse section through inlet guide vanes of the radial inward flow type such as are shown in elevation in Fig. 1.

The turbine impeller disclosed in the drawing is a substantially exact scale drawing of an actual impeller as constructed and successfully operated to produce very satisfactory commercial efficiencies. While the drawing discloses the invention embodied in a three-vane impeller having radial vanes the projected area of which is less than 52 per cent and approximately 50 per cent of the area of the constricted adjacent portion of the conduit, it will be understood that the number and the projected area of the vanes may be varied through a considerable range without departing from the present invention. Although the projected vane area may in some cases be as high as 80 per cent of the conduit cross-section, it is desirable to have this vane area substantially less than the conduit area in order to produce results such as contemplated by the present invention. The turbine may, however, be arranged horizontally or otherwise, instead of vertically, without departing from the present invention.

The hydraulic turbine installation disclosed in Fig. 1 comprises a stationary turbine casing 10 forming a conduit 4 sealed from atmosphere and connecting the penstock 9 with the draft tube 11. The conduit 4 is provided with a vertical local constriction 5 adjacent which is located a turbine impeller 2. The impeller 2 comprises three vanes radiating from a central hub 8 of small diameter secured to the vertical shaft 3. The casing 10 is provided with an inverted substantially frustro-conical stationary guide 6 which in co-operation with the lower casing 10 forms a vane-free transition space for changing the direction of flow of the liquid and which also forms a support for a ball bearing of the shaft 3 adjacent the impeller 2. The stationary guide 6 extends in close proximity to the impeller 2 and besides providing a bearing for the shaft 3 as near to the impeller as possible, prevents the rapidly moving stream of liquid from flowing in contact with the rotating shaft 3. Governor controlled movable inward flow guide vanes 7 of usual construction as shown in Figs. 1 and 6, have pivots 27 which are mounted in upper and lower bearings in the casing 10 and support 26 respectively, these vanes 7 being adapted to control the flow of liquid to the conduit 4. The vanes 7 produce swirling of the stream passing through the vane-free transition space leading to the runner 2, and are adjustable to alter the degree of swirl and the volume of the flow, by means of a ring 25 and mechanism such as disclosed in Patent No. 1,197,761, granted September 12, 1916.

The guide vanes 7 are of the type known generally in the art as "radial" flow, but actually create a flow having both tangential and radial components, that is, components which are tangential relatively to a circle surrounding the turbine axis and other components which are radial with respect to the same circle. The resultant flow is neither tangential nor radial but has a spiral course gradually approaching the turbine axis. When the guide vanes 7 are adjusted to different positions, the direction of the resultant flow or the degree of whirl of the stream delivered past the guide vanes 7, is automatically varied in accordance with the direction of such vane adjustment.

The hydraulic turbine installation disclosed in Fig. 2 comprises a stationary casing 22 forming a vertical conduit 4 connecting the penstock 19 with the draft tube 11. The conduit 4 is provided with a vertical vane-free transition space having a local constriction 5 adjacent which is located a turbine impeller 2 similar to the impeller disclosed in Fig. 1. A stationary guide 16 secured to the casing 22 is mounted within the conduit 4 adjacent the central hub 8 of the impeller 2, this guide 16 extending in close proximity to the impeller 2 and preventing the swirling stream of liquid in the transition space from flowing in contact with the shaft 3 at the constriction 5. The stationary guide 16 forms a support for a ball bearing of the shaft 3 adjacent the impeller 2. Movable axial flow guide vanes 17 having pivot bearings in the stationary guide 16 and in the casing 22 are located in the conduit 4 in advance of the transition space and of the constriction 5 and control the flow of liquid to the conduit and the degree of the swirling of the stream in the transition space. The vane free transition space is located below the guide vanes 17 and above the inlet edges of the impeller 2, and serves to permit the swirling streams delivered from the space between the vanes 17 to consolidate and to assume a natural whirl before entering the impeller 2.

The vanes of the impeller 2 radiate from the central hub 8 which is made as small in diameter as possible in order to position the inner ends of the vanes as near to the impeller axis as possible. These vanes are preferably formed of sufficient strength so that no bracing means such as an outer rim, are necessary, in order to reduce to a minimum the friction losses by reducing the wetted impeller surface. The angularity of the leading vane surfaces, relatively to a plane perpendicular to the axis of the impeller, diminishes receding from the impeller axis, these surfaces forming an angle relatively to this plane of approximately 50 degrees adjacent the hub 8 and this angle diminishing gradually to a value of approximately 15 degrees adjacent the impeller periphery. The angularity of the leading vane surfaces is such that the vanes are urged forward about the impeller axis and across the advancing stream, a considerable distance for a relatively slight advance of the liquid along the conduit 4. The angularity of the impeller vanes relatively to a plane which is perpendicular to the impeller axis cannot, however, be reduced below a critical minimum value. If the vane angle is reduced below such value, the vane or vanes will no longer decelerate the entire incompressible stream of liquid flowing through the conduit, but will only obstruct the portion of the stream in line with the vane, thereby splitting up the stream and agitating the liquid to produce cavitation. The impeller surfaces are also preferably formed with substantially straight line generatrices extending radially of the impeller axis as well as at right angles thereto, in order to reduce to a minimum the wetted vane surface.

In the form of impeller 12 disclosed in Figs. 4 and 5 the shaft 13 is provided with a central air passage 14 communicating with atmosphere and having radial passages 15 communicating therewith and extending through the impeller hub 18 and the impeller vanes. Series of relatively small air holes 20 connect the radial passages 15 with the lower surfaces of the impeller vanes, the outer ends of the passages 15 being closed by means of plugs 21. With this construction the friction on the lower or trailing surfaces of the impeller vanes is reduced by an induced flow of air through the passages 13, 15, and the holes 20, which forms a thin film of air upon the trailing vane surfaces. The flow of air is induced by the reduced pressure in the draft tube 11 and may be regulated by suitable valves.

During the normal operation of the turbine the guide vanes 7, 17 are operated either manually or by means of a speed governor, in the usual manner, to produce and to control the flow of liquid from the penstock 9, 19 into the conduit 4. As the swirling stream of liquid enters the constriction 5 of the conduit 4, the velocity thereof is augmented to produce a relatively rapidly flowing jet adjacent the impeller 2. When the swirling liquid strikes the tilted leading vane surfaces of the impeller 2, it urges the impeller forward across the jet of liquid at a sufficient velocity to obstruct and decelerate the entire stream. As the projected vane area of the impeller is substantially less than the area of the constriction 5 of the conduit 4, the impeller 2 must for a predetermined shaping of the vanes, rotate at a speed which is sufficiently high to avoid local obstruction and deceleration of one portion of the stream without producing a like effect upon other portions, as such action would cause objectionable cavitation. The angularity of the leading vane surfaces is made to approach the critical minimum value as closely as possible without sacrificing efficiency, in order to produce a high rotative speed. Such high rotative speed is especially desirable in large units since the design and construction of the energy-translating machinery such as electrical generators, are thereby greatly simplified and cheapened.

The construction of the impeller 2 is such that friction losses are minimized wherever possible, the reduction to a minimum of the number of vanes, the elimination of peripheral stiffening rims, the formation of the vanes with straight line generatrices, and the provision of stationary guiding means extending in proximity to the impeller, being important factors in reducing the friction losses. The impeller of the present invention differs in operation from the Francis type of impeller, since the rate of discharge of the present turbine increases as the rotative speed increases, whereas in the Francis turbine this rate remains substantially constant. This feature makes the present invention especially valuable for application where the available head is low since relatively great variations in head will not appreciably affect the efficiency of the unit, whereas such variations greatly affect the efficiencies of the prior art turbines.

The installation disclosed in Fig. 1 is probably the preferable type since the movable guide vanes 7 may be of relatively simple and standard construction whereas the guide vanes 17 disclosed in Fig. 2 are somewhat difficult to construct. With the construction shown in Figs. 4 and 5, the friction losses may be reduced to a still greater extent than in the form of impeller 2, although the admission of air must be limited in order to maintain the desirably high draft tube efficiency. It will be apparent that the efficiency of the installations disclosed in the drawings will depend, as in the ordinary installations, upon the draft tube efficiency, but that the impeller will cooperate effectively with any form of draft tube having desirably high efficiency.

It should be understood that it is not desired to be limited to the exact details of construction herein shown and described, for obvious modifications may occur to a person skilled in the art.

It is claimed and desired to secure by Letters Patent:

1. In combination, means forming a conduit, a rimless turbine impeller in said conduit having a projected vane area substantially less than the adjacent conduit cross-section, said conduit having a vane free transition space in advance of said impeller, and flow decelerating means associated with said conduit on the discharge side of said impeller.

2. In combination, means forming a conduit, a rimless turbine impeller in said conduit having a projected vane area substantially less than the adjacent conduit cross-section, and swirl producing means associated with said conduit on the inlet side of said impeller, said conduit having a vane free transition space between said flow control means and said turbine impeller.

3. In combination, means forming a locally constricted conduit, a rimless turbine impeller in said conduit adjacent to said constriction and having a projected vane area substantially less than the constricted conduit cross-section, said conduit having a vane free transition space in advance of said impeller, and flow decelerating means associated with said conduit beyond said impeller.

4. In combination, means forming a locally constricted conduit, a rimless turbine impeller in said conduit adjacent to said constriction and having a projected vane area substantially less than the constricted conduit cross-section, and swirl producing means associated with said conduit in advance of said impeller, said conduit having a vane free transition space between said flow control means and said constriction.

5. In combination, means forming a conduit, a rimless turbine impeller in said conduit having a projected vane area substantially less than the adjacent conduit cross-section, flow control means associated with said conduit on one side of said impeller, said conduit having a vane free transition space between said flow control means and said impeller, and flow decelerating means associated with said conduit on the opposite side of said impeller.

6. In combination, means forming a locally constricted conduit, a rimless turbine impeller in said conduit adjacent to said constriction and having a projected vane area substantially less than the constriction cross-section, flow control means associated with said conduit on one side of said impeller, said conduit having a vane free transition space between said control means and said constriction, and flow decelerating means associated with said conduit on the opposite side of said impeller.

7. In a high speed reaction water turbine, the combination of a conduit forming means, means for controlling the flow of fluid through said conduit, and a turbine impeller in said conduit having radiating vanes with their outer ends spaced apart circumferentially, the projected area of the said vanes being substantially equal to the projected area of the spaces between the said vanes, the latter being of varying angularity relative to a plane perpendicular to the impeller axis.

8. In combination, means forming a locally constricted conduit, means for positively producing a swirling flow of liquid through said conduit, the portion of said conduit beyond said flow producing means providing a vane free transition space, and a rimless turbine impeller in said conduit beyond said transition space, said impeller having a projected vane area substantially less than the constriction cross-section.

9. In combination, means forming a locally constricted conduit, means for controlling the flow of liquid through said conduit, the portion of said conduit beyond said flow controlling means providing a vane free transition space, and a turbine impeller in said conduit beyond said transition space, said impeller having a projected vane area substantially less than the constriction cross-section and the vanes of said impeller having varying angularity throughout their lengths.

10. In combination, means forming a locally constricted conduit, means for controlling the flow of liquid through said conduit, the portion of said conduit beyond said flow controlling means providing a vane free transition space, and a turbine impeller in said conduit entirely beyond said transition space and said constriction and having a projected vane area substantially less than the constriction cross-section.

11. In combination, means forming a closed conduit, means for controlling flow of liquid through said conduit, and a turbine impeller in said conduit having a projected vane area substantially less than the adjacent conduit cross-section, said impeller being provided with fixedly attached vanes having inner ends closely adjacent the axis of said impeller and having free outer ends, and said vanes having varying angularity throughout their lengths.

12. In combination, an axial flow impeller having a shaft, inlet means forming a vane-free transition space in advance of said impeller, and a stationary bearing for said shaft, said bearing being located in said transition space adjacent to said impeller.

13. In combination, an impeller through which fluid whirls in an axial direction only, means providing an axial flow conduit forming an axially extending vane-free transition space at the inlet side of said impeller, adjustable means for producing variable whirling motion of the fluid admitted to said transition space, and a flow decelerator communicating with the discharge side of said impeller.

14. In combination, a rimless impeller through which fluid whirls in an axial direction only, means providing an axial flow conduit forming an axially extending vane-free transition space at the inlet side of said impeller, adjustable means surrounding the axis of said impeller, said adjustable means being adapted to produce variable whirling motion of the fluid admitted to said transition space, and a flow decelerator communicating with the discharge side of said impeller.

15. In combination, an impeller through which fluid whirls in an axial direction only, means providing a purely axial flow conduit forming an axially extending vane-free transition space communicating with the inlet side of said impeller, means for producing whirling motion of fluid entering said conduit and flowing through said transition space, and a flow decelerator communicating with the discharge side of said impeller.

16. In combination, an axial flow impeller, means providing an axial flow conduit forming an axially extending vane-free transition space communicating with the inlet side of said impeller, means for producing whirling motion of fluid delivered to said transition space, and a flow decelerator communicating with the discharge side of said impeller.

17. In combination, an axial flow impeller, means providing an axial flow conduit forming an axially extending vane-free transition space communicating with the inlet side of said impeller, means for producing variable whirling motion of fluid delivered to said transition space, and a flow decelerator communicating with the discharge side of said impeller.

18. In combination, an axial flow impeller, means providing an axial flow conduit forming an axially extending vane-free transition space at one side of said impeller, adjustable guide vanes in advance of said space and surrounding the axis of said impeller, means for adjusting said guide vanes to control the flow of fluid passing said vanes, and a flow decelerator communicating with the discharge side of said impeller.

19. In combination, a rimless impeller through which fluid whirls in an axial direction only, means providing an axial flow conduit forming an axially extending vane-free transition space at the inlet side of said impeller, adjustable guide vanes in advance of said space and surrounding the axis of said impeller, means for adjusting said guide vanes to control the flow of fluid delivered to said transition space and to vary the degree of whirl of said fluid, and a flow decelerator communicating with the discharge side of said impeller.

20. In combination, a rimless impeller through which fluid whirls in an axial direction only, means providing a purely axial flow conduit forming an axially directed vane-free transition space at the inlet side of said impeller, adjustable guide vanes in advance of said space and movable about axes extending transversely of the axis of said impeller, means for moving said guide vanes to control the flow of fluid delivered to said transition space and to vary the degree of whirl of said fluid, and a flow decelerator communicating with the discharge side of said impeller.

21. In combination, a rotary motion transmitting element, an impeller associated with and formed to convert the energy of whirling liquid into torque in said element, means providing a conduit forming an axially extending vane-free transition space communicating with the inlet side of said impeller, means for producing whirling motion of fluid flowing through said transition space, and a flow decelerator communicating with the discharge side of said impeller.

22. In a hydraulic machine, a rotor comprising vanes having oppositely disposed pressure and suction faces, means forming a vane free conduit for admitting a freely whirling vortex of liquid to the pressure faces of said rotor vanes, a flow decelerator communicating with the suction faces of said rotor vanes, and means for admitting air along the suction faces of said vanes and into said decelerator.

23. In a hydraulic machine, an axial flow rotor comprising vanes having oppositely disposed pressure and suction faces, means forming a vane free transition space for delivering a freely whirling vortex of liquid to the pressure faces of said rotor vanes, a flow decelerator communicating directly with the suction faces of said rotor vanes, and means for delivering a film of air along the suction faces of said vanes and into said decelerator.

24. In a hydraulic machine, an axial flow rotor comprising vanes having oppositely disposed pressure and suction faces, means forming a purely axial flow vane free transition space for delivering a freely whirling vortex of liquid against the pressure faces of said vanes, a flow decelerator communicating with the suction faces of said vanes, and means for delivering a film of air along the suction face of each of said vanes and from the discharge edges thereof into said decelerator.

25. In a hydraulic machine, an axial flow rotor formed to rotate at relatively high speed, means forming a vane free conduit communicating with the inlet side of said rotor, adjustable whirl producing means located in advance of said conduit, and a flow decelerator communicating with the discharge side of said rotor.

26. In a hydraulic machine, an axial flow rotor formed to rotate at relatively high speed, means forming a conduit having a vane free axial flow portion communicating directly with the inlet side of said rotor, whirl producing means within said conduit a substantial distance in advance of said vane free portion, and a flow decelerator communicating directly with the discharge side of said rotor.

27. In combination, means forming a conduit, means for controlling the flow of fluid through said conduit, and a turbine impeller in said conduit having radiating vanes with their outer ends spaced apart circumferentially, the projected area of said vanes being substantially equal to the projected area of the intervening spaces and said vanes having surfaces of increasing angularity relative to the plane perpendicular to the turbine axis and approaching said axis.

28. In combination, means forming a conduit, means for controlling the flow of fluid through said conduit, a turbine impeller in said conduit having radiating vanes with their outer ends spaced apart circumferentially, said vanes having surfaces of increasing angularity relative to a plane perpendicular to the turbine axis and approaching said axis, and a flow decelerator communicating with the discharge side of said impeller.

29. In a hydraulic machine, an axial flow impeller formed to rotate at relatively high speed, means forming a conduit having a vane free portion communicating with the inlet side of said impeller, adjustable means for varying the degree of whirl of the fluid delivered to said impeller through said space, and a flow decelerator communicating with the discharge side of said impeller.

30. In a hydraulic machine, an impeller formed to rotate at relatively high speed, means forming a conduit having an axial flow vane free portion communicating with the inlet side of said impeller, adjustable means for varying the degree of whirl of the fluid delivered to said impeller through said space, and a flow decelerator communicating with the discharge side of said impeller.

31. In a hydraulic machine, an impeller formed to rotate at relatively high specific speed, means forming an axial flow conduit having a vane free portion communicating with the inlet side of said impeller, adjustable means within said conduit for varying the degree of whirl of the fluid delivered to said impeller through said space, and a flow decelerator communicating with the discharge side of said impeller.

32. The method of utilizing the energy of water under head which consists in directing its flow with whirling components along a common axis, varying the degree of said whirling components but preserving said whirling components so as to produce a solid stream whirling about and advancing along an axis, directing the stream against an impeller confined within a stationary surface, and decelerating the flow of said stream upon delivery thereof from said impeller.

In testimony whereof, the signature of the inventor is affixed hereto.

FORREST NAGLER.